UNITED STATES PATENT OFFICE.

NATHAN SULZBERGER, OF NEW YORK, N. Y.

METHOD OF PACKING CATALYTICALLY-USEFUL SUBSTANCES.

1,223,123.     Specification of Letters Patent.     Patented Apr. 17, 1917.

No Drawing.     Application filed September 5, 1916. Serial No. 118,409.

*To all whom it may concern:*

Be it known that I, NATHAN SULZBERGER, a citizen of the United States, residing at Hotel Netherland, Fifty-ninth street and Fifth avenue, New York city, in the county and State of New York, have made new and useful Improvements in Methods of Packing Catalytically-Useful Substances, of which the following is a specification.

In many instances, it is desirable to prepare the catalytic substances at places distant from the point or points, where the catalytic process is to be carried on. It is also found advantageous to prepare amounts of catalytic material over those for immediate use, as by manufacturing larger amounts at one and the same time, very often a saving of labor, etc., is obtained. In such case, it will be found to be necessary to carry and store the excessive amount of catalytic material in a form, which will preserve its catalytic efficiency, in which form it may also be shipped without losing its value as a catalyst.

I have found that the above may be accomplished by embodying the catalytic material in the substance, in connection with which it is intended to be used. While substances belonging to the same class may also be found valuable, I preferably desire to use the substance, which is to be catalytically treated, for by so doing no foreign material need enter into the process.

As an example of how I prefer to store or ship a catalyst adapted for hydrogenating cottonseed oil, I will cite the following, without however limiting myself in any way to the specific method and product described, which may variously be modified without leaving the scope of the invention.

A catalyst, for instance, such as is obtained by rendering nickelsilicate (the product obtained, for example, by precipitating a nickelsalt with sodiumsilicate) catalytically active by subjecting such nickelsilicate to a process of reduction by means of hydrogen at high temperatures, is immediately after such reduction, cooled while still in the atmosphere of the hydrogen, and covered with hydrogenated cottonseed oil, which will solidify to a solid mass. This hydrogenated oil is poured over the dark or black reduced nickelsilicate after having been heated somewhat above its melting-point and allowed to solidify only after the catalyst has been well mixed and suspended in the oil. The product will solidify to a more or less dark to black mass, which will be of a homogeneous nature. In this condition the catalyst can be kept and stored away, as well as shipped to points for its use. The homogeneous nature of the product makes it possible to procure given and desired quantities of the nickel-catalyst by simply weighing off amounts of the mass or taking pieces of certain size and bulk. The mass may contain lines or markings, from which the amounts of catalyst contained in pieces of certain size may be judged, so as to make weighing off of desired quantities unnecessary. The mass may also be formed in individual pieces (cubes, tablets, balls, etc.) containing definite amounts of the catalytic agent. If this catalytic material is to be used for hydrogenating cottonseed oil, I prefer to use, as a vehicle, hydrogenated cottonseed oil or cottonseed stearing, so as not to introduce a foreign substance into the cottonseed oil, which is to be catalytically treated, but other substances, soluble in cottonseed oil, may be used, as long as they will not destroy the catalytic action of the catalyst. The nature of the vehicle will therefore depend greatly on the specific material, which is to be treated catalytically. In cases it may even be found of advantage to use an unhydrogenated or only partially hydrogenated material, or a material, which is not, or only slightly hydrogenizable, like paraffin, and the catalyst simply covered and mixed with such material. It is also not necessary to mix into the vehicle the catalyst, while the same is continually kept in the atmosphere of the hydrogen. In some cases it may be of advantage to treat the vehicle with hydrogen (or the gas etc., which is to be used in the catalytic process) before employing. It is preferable in most cases to have the vehicle well dried. The above-described nickel-catalyst is especially adapted for embodiment in such a suitable vehicle, in which the same may be stored and shipped, for the reason, that it is not as bulky, as catalyzers on carriers like kieselguhr etc. Such catalyzers may however be similarly embodied in a vehicle and come under the scope of the invention. When using a catalyst embodied in the same oil and material (fatty acid, etc.), which is to be treated catalytically, the amount of oil, etc., of such catalyst increases the yield of the treated product, so that no dead freight has to be paid. It is therefore also from this point of view advantageous to use, as a vehicle hardened or hydrogenated cottonseed oil, for a cottonseed oil catalyst, corn oil for a hardened or hydrogenated corn oil catalyst, etc. Mixtures of catalysts may also be made use of by themselves, as well as with substances not destroying the catalytic action. The products may also be put up in a pasty or semi-solid condition.

Claims:

1. Method for preserving the catalytic activity of a catalyst so as to allow its shipment without loss of its catalytic activity and its use in known amounts, which comprises mixing the same with material of a fatty nature solid at ordinary temperatures and subdividing the mass into solid pieces each of which contains known amounts of the catalytic agent.

2. Method for preserving the catalytic efficiency of the reduction-product of the precipitate caused by treating a soluble nickel-compound with sodium-silicate, so that same may be shipped without loss of its use for catalytically hardening material of a fatty and oily nature, which comprises mixing same with material of a fatty and oily nature, which will not destroy its catalytic property and of such a melting point, that this material will be in solid form at ordinary temperature and subdividing the mass into solid pieces each of which contains known amounts of the catalytic agent.

3. Method for preserving the catalytic efficiency of the reduction-product of the precipitate caused by treating a compound of nickel with sodium-silicate, so that same can be shipped without loss of its value for a hydrogenating process, which comprises mixing the same in hardened cottonseed oil, which has such consistency, that it forms a solid at ordinary temperature and subdividing the mass into solid pieces each of which contains known amounts of the catalytic agent.

4. Method for preserving the catalytic efficiency of a catalyst for use in hydrogenating cottonseed oil, so as to allow its shipment without loss of its catalytic activity, which comprises mixing the same with hydrogenated cottonseed oil of such consistency that the same will be solid at ordinary temperature and subdividing the mass into solid pieces each of which contains known amounts of the catalytic agent.

5. Method for increasing the keeping quality of a nickel-catalyst, such as is obtained by precipitating a nickel-compound with sodium-silicate and rendering such precipitate catalytically active, so that such catalyst may be safely stored and shipped without substantial loss of its catalytic efficiency, which comprises mixing such catalyst with a material of a fatty and oily nature hydrogenated by some other amount of a catalytic agent to such degree of consistency, that the same will be in a solid condition at ordinary temperature and subdividing the mass into solid pieces each of which contains known amounts of the catalytic agent.

6. Precipitated nickelsilicate rendered catalytically active and adapted for use in hydrogenating cottonseed oil, representing a dark, solid, fatty mass of such keeping qualities that the same may be shipped without losing its catalytic action and subdivided into solid pieces each of which contains known amounts of the catalytic agent.

7. A catalyst adapted for use in hydrogenating oil and possessing high keeping quality, representing a solid fatty mass of dark color subdivided into solid pieces each of which contains known amounts of the catalyst.

8. A catalyst containing nickel and adapted for use in hydrogenating cottonseed oil representing a dark or black solid, fatty mass, divided into pieces, each one of which contains a known amount of catalytic activity.

9. A catalyst containing a reduction-product of precipitated nickelsilicate and adapted for use in hydrogenating cottonseed oil, representing a dark, solid substance of fatty nature of high keeping property, so that same may be stored and shipped without substantial deterioration, shaped into pieces, each one of which possesses a known catalytic efficiency.

10. A catalyst containing a reduction-product of nickel-silicate and adapted for use in hydrogenating an unsaturated material of a fatty nature, representing a dark, solid, fatty substance of homogeneous composition, subdivided into pieces containing known amounts of the reduction product.

NATHAN SULZBERGER.

Witnesses:
O. P. Breen,
E. G. S. Wellenkamp.